3,017,326
3-AMINO-4-PHENYLPYRAZOLE MUSCLE RELAXANT PREPARATIONS AND METHOD OF PRODUCING SKELETAL MUSCLE RELAXATION
Leonard Cook, Abington, Pa., assignor to Smith Kline & French Laboratories, Philadelphia, Pa., a corporation of Pennsylvania
No Drawing. Filed June 4, 1959, Ser. No. 818,012
7 Claims. (Cl. 167—65)

This invention relates to pharmaceutical preparations having muscle relaxant activity and a method of producing skeletal muscle relaxation.

It is well-known that the spasm of skeletal muscle is painful and in a great majority of the cases the patient is considerably disabled. There has been a constant search for skeletal muscle relaxant preparations which would be effective in low doses and be relatively free of adverse side effects particularly depression and other central nervous system depressant effects.

The novel medicinal preparations of this invention are indeed unique in that they are potent, long acting muscle relaxants and have an unexpectedly lower incidence of side effects than presently known muscle relaxant preparations. Furthermore, these preparations permit the patient to become ambulatory much sooner by restoring normal muscular function without reducing muscle strength or reflex activity. These novel preparations are unusually effective in low doses demonstrating a rapid prolonged action.

Most advantageously, the preparations of this invention are in dosage unit form and comprise a nontoxic pharmaceutical carrier and 3-amino-4-phenylpyrazole which has the following structural formula:

FORMULA I

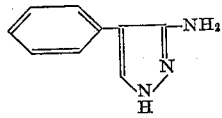

The 3-amino-4-phenylpyrazole present in these novel compositions is prepared by reacting β-nitrostyrene and diazoacetic ester to form 3-carbethoxy-4-phenylpyrazole. The carbethoxypyrazole and hydrazine hydrate are in turn reacted in an alcoholic solution to yield 3-carbohydrazide-4-phenylpyrazole. An acid aqueous solution of the corresponding hydrazide is then treated with sodium nitrite with the formation of ethyl 3-carbamate-4-phenylpyrazole which is converted to the desired 3-amino-4-phenylpyrazole by treating the carbamate with a base such as sodium hydroxide.

A nontoxic pharmaceutically acceptable organic or inorganic acid addition salt of the base may be used in lieu of the base, for example, the salt derived from acids such as sulfuric, nitric, phosphoric, citric, acetic, lactic, tartaric, ethanedisulfonic, sulfamic, succinic, fumaric, maleic, hydrobromic, benzoic and similar nontoxic acids. The salts are best prepared by reacting the free base with a stochiometric amount of the desired organic or inorganic acid in a suitable solvent such as ethyl acetate-ether solution, ethanol, acetone, water or various combinations of solvents.

The 3-amino-4-phenylpyrazole ingredient will be present in an amount to produce skeletal muscle relaxation. Preferably the preparations will contain the active medicament in an amount of from about 50 mg. to about 750 mg., advantageously from about 100 mg. to about 500 mg. per dosage unit.

The pharmaceutical carrier may be, for example, either a solid or liquid. Exemplary of solid carriers are lactose, magnesium stearate, terra alba, sucrose, talc, stearic acid, gelatin, agar pectin or acacia. Exemplary of liquid carriers are peanut oil, olive oil, sesame oil and water. Similarly, the carrier or diluent may include a time delay material such as glyceryl monostearate or glyceryl distearate alone or with a wax.

A wide variety of pharmaceutical forms can be employed. Thus, if a solid carrier is used, the preparation can be tabletted, used as a pharmaceutical powder, placed in a hard gelatin capsule or in the form of a troche or lozenge. The amount of solid carrier per dosage unit will vary widely but preferably will be from about 25 mg. to about 1 gm. If a liquid carrier is used, the preparation may be in the form of a soft gelatin capsule or a liquid suspension.

In veterinary practice, the preparations can be given per se or as an additive to the feed or drinking matter of the animals.

These preparations are made following the conventional techniques of the pharmaceutical chemist involving mixing, granulating and compressing when necessary or variously mixing and dissolving the ingredients as appropriate to the desired end product.

The method in accordance with this invention comprises administering internally to animals, including man, 3-amino-4-phenylpyrazole or a nontoxic organic or inorganic acid addition salt thereof preferably combined with a nontoxic pharmaceutical carrier, for example any of the above preparations in an amount to produce skeletal muscle relaxation. The active medicament, preferably will be in dosage units in an amount of from about 50 mg. to about 750 mg., advantageously from about 100 mg. to about 500 mg. The administration may be parenterally or orally, the latter being the preferable route of administration. Advantageously equal doses will be administered one to four times daily. Preferably the daily dosage will be from about 50 mg. to about 3000 mg. of active medicament advantageously from about 300 mg. to about 2500 mg. When the administration described above is carried out skeletal muscle relaxation is produced rapidly and effectively. This method of producing skeletal muscle relaxation is particularly effective when applied to animals, advantageously human beings, having disorders in which skeletal muscle spasm of spasticity is an important symptom.

The following examples are not limiting but are illustrative of pharmaceutical compositions of this invention.

*Example 1*

A solution of 149 g. of β-nitrostyrene and 228 g. of diazoacetic ester in 500 ml. of benzene is heated externally with a heating mantle until an exothermic reaction sets in at approximately 71° C. Following a vigorous reaction which quickly moderates, the resulting mixture is refluxed overnight. The termination of nitrogen dioxide evolution indicates complete reaction. The dark solution is cooled and the yellow precipitate filtered and washed with cold benzene to yield 3-carbethoxy-4-phenylpyrazole.

A solution of 260 g. of 3-carbethoxy-4-phenylpyrazole and 260 ml. of 85% hydrazine hydrate is refluxed for 4 hours, cooled and the resulting yellow precipitate is 3-carbohydrazide-4-phenylpyrazole.

A solution containing 290 g. of the hydrazide, 223 ml. of 6 N HCl and four liters of water is cooled to 10° C. and a solution of 82 g. of sodium nitrite in one liter of water is slowly added. The white solid is removed by filtration and dried at room temperature in vacuo. The dried solid is then added to 2700 ml. of ethanol and the resulting solution is heated at reflux for seven hours and is then concentrated to a volume of 500 ml. under vacuum. The concentrate is diluted to 4 liters with water and the white solid which precipitates is removed by filtration and washed well with cold water. The resulting ethyl 3-carbamate-4-phenylpyrazole is then recrystallized from aqueous ethanol.

A mixture of 170 g. of the ethyl 3-carbamate-4-phenylpyrazole, 12 liters of water, one liter of ethanol and 465 g. of sodium hydroxide is heated for 3 hours. After 45 minutes the reaction mixture is cooled and extracted with ether. The ethereal solution is extracted with dilute hydrochloric acid and the resulting solution is treated until evolution of carbon dioxide no longer occurs. The cooled acid aqueous solution is neutralized with 20% sodium hydroxide to yield the desired 3-amino-4-phenylpyrazole as a white solid. The product is recrystallized from aqueous alcohol and has a melting point of 176–177° C.

Example 2

Ingredients:

| | Amounts, mg. |
|---|---|
| 3-amino-4-phenylpyrazole | 250 |
| Sucrose | 50 |
| Starch | 30 |
| Talc | 6 |
| Stearic acid | 3 |

The sucrose, calcium sulfate and 3-amino-4-phenylpyrazole hydrochloride are thoroughly mixed and granulated with 10% gelatin solution. The wetted mass is passed through a #6 U.S. mesh screen directly onto drying trays. The granules are dried at 120° F. and passed through a #20 U.S. mesh screen. These granules are then mixed with the starch, talc and stearic acid, passed through a #60 U.S. mesh screen and then compressed into tablets.

One tablet is administered four times a day.

Example 3

Ingredients:

| | Amounts, mg. |
|---|---|
| 3-amino-4-phenylpyrazole | 500 |
| Lactose | 100 |

Screen above ingredients through a #40 U.S. mesh screen, transfer to mixer, mix well and fill into a #0 hard gelatin capsule.

One capsule is administered twice a day.

Ingredients:

| | Amounts, mg. |
|---|---|
| 3-amino-4-phenylpyrazole sulfate | 750 |
| Lactose | 25 |

Mix above ingredients well and fill into a #00 hard gelatin capsule.

One capsule is administered three times a day.

Example 5

Ingredients:

| | Amounts, mg. |
|---|---|
| 3-amino-4-phenylpyrazole citrate | 50 |
| Peanut oil | 250 |

The ingredients are mixed into a thick slurry and filled into a soft gelatin capsule.

Example 6

Ingredients:

| | Amounts, mg. |
|---|---|
| 3-amino-4-phenylpyrazole | 400 |
| Magnesium stearate | 5 |
| Lactose | 25 |

Mix above ingredients well and fill into a #1 hard gelatin capsule.

Example 7

Ingredients:

| | Amounts, mg. |
|---|---|
| 3-amino-4-phenylpyrazole | 100 |
| Lactose | 450 |

Mix above ingredients well and fill into a #0 hard gelatin capsule.

One capsule is administered orally three times a day.

What is claimed is:

1. A pharmaceutical preparation having muscle relaxant activity, in dosage unit form, comprising a pharmaceutical carrier and from about 100 mg. to about 500 mg. of a member selected from the group consisting of 3-amino-4-phenylpyrazole and its nontoxic pharmaceutically acceptable acid addition salts.

2. A method of producing muscle relaxation which comprises internally administering a compound selected from the group consisting of 3-amino-4-phenylpyrazole and its nontoxic pharmaceutically acceptable acid addition salts in an amount sufficient to produce muscle relaxation.

3. The method of claim 2 in which the administration is orally to human beings afflicted with muscle spasm.

4. A method of producing muscle relaxation which comprises internally administering a daily dosage of about 50 mg. to about 3000 mg. of a compound selected from the group consisting of 3-amino-4-phenylpyrazole and its nontoxic pharmaceutical acceptable acid addition salts.

5. The method of claim 4 in which the administration is orally to human beings afflicted with muscle spasm.

6. A method of producing muscle relaxation which comprises orally administering a daily dosage regimen of about 300 mg. to about 2500 mg. of a compound selected from the group consisting of 3-amino-4-phenylpyrazole and its nontoxic pharmaceutical acceptable acid addition salts.

7. The method of claim 6 in which the administration is orally to human beings afflicted with muscle spasm.

References Cited in the file of this patent

UNITED STATES PATENTS 2,857,395    Arnold et al.    Oct. 21, 1958

OTHER REFERENCES

Parham et al.: J. A. Chem. Soc., vol. 73, No. 10, October 1951, pp. 4664–4666.

Jenkins et al.: "The Chemistry of Organic Medicinal Products," 4th ed., John Wiley and Sons, Inc., N.Y., N.Y., pp. 395–406.

Chem. Abstracts, vol. 50 (1956) #9388c Logemann et al.